UNITED STATES PATENT OFFICE.

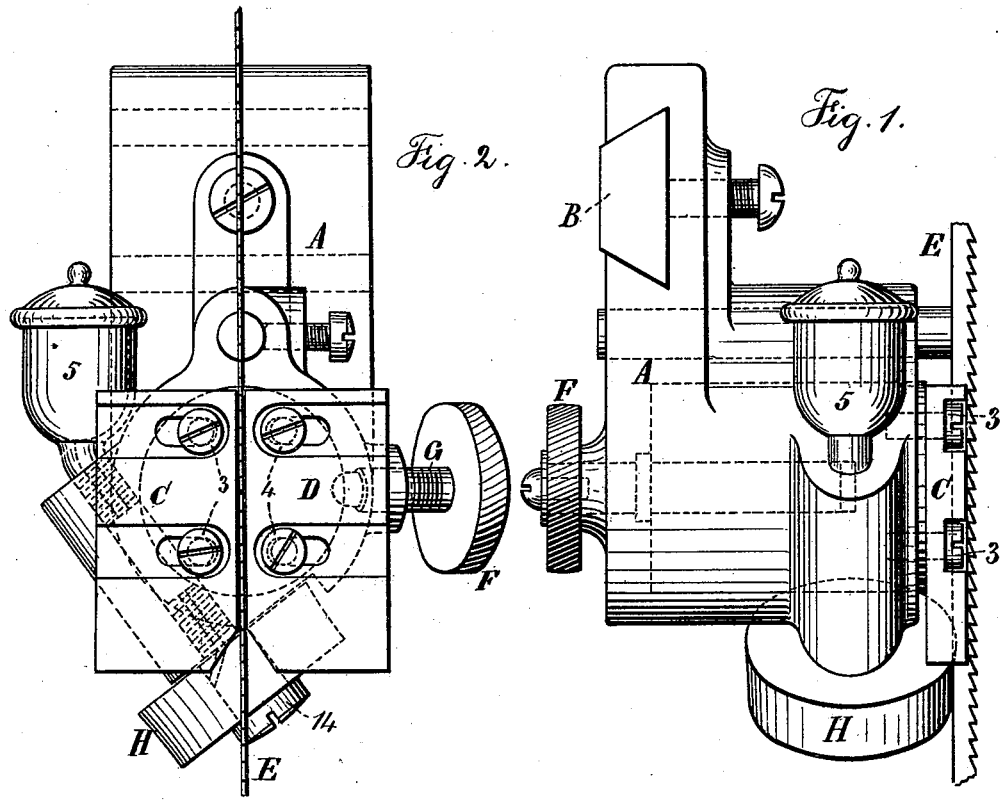

REUBEN McCHESNEY, OF FRANKFORT, NEW YORK.

GUIDE FOR BAND-SAWS.

SPECIFICATION forming part of Letters Patent No. 405,110, dated June 11, 1889.

Application filed December 23, 1887. Serial No. 258,797. (No model.)

*To all whom it may concern:*

Be it known that I, REUBEN MCCHESNEY, of Frankfort, in the county of Herkimer and State of New York, have invented an Improvement in Guides for Band-Saws, of which the following is a specification.

It is usual to pass the band-saw between two stationary guides for retaining the same in position sidewise, and in some instances a rotary support for the back of the saw has been made use of, and this rotary support has been revolved by a pulley and band or by a screw-pinion, the object being to present to the back of the saw a moving surface, and thereby prevent such guide from becoming grooved or channeled by the movement of the saw. A conical roller has also been used to form the back guide, so that the same has been revolved by the movement of the saw; but the same was above the side guides, and the largest end of the conical roller being downwardly the saw acted against an inclined surface and was not reliably supported.

My invention relates to the combination, with the side guides, of a roller below the same, the axis of which is inclined and the roller is slightly concave in its face, so as to take a proper bearing against the saw.

In the drawings, Figure 1 is an elevation of the guide-block, side guides, and guide-wheel, and side view of part of the band-saw. Fig. 2 is a front elevation of the guide-block and guide-wheel and of a portion of the band-saw, and Fig. 3 is a section of a modification in the guide-wheel.

The stock A or guide-block is supported upon any suitable bar or rod. I have shown the same as a trapezoidal bar B, passing through a correspondingly-shaped slot in the stock A, and upon the face of the stock A are the slotted plates C D, connected in any suitable manner—such as by the screws 3 and 4—that pass through the slots into a spring-cylinder within the stock, and these plates are adjustable nearer to or farther from each other, so as to receive between them the band-saw E, and it is usual to provide a thumb-wheel F and screw G to adjust the parts, so that the guide D may be moved nearer to or farther from the guide C to adapt the parts to any thickness of saw. The back guide for the saw is in the form of a wheel or roller H, which is below the stock A and sustained in suitable bearings. The axis of this wheel H is at an inclination to the band-saw, so that the back of such saw passes diagonally across the periphery of the wheel, and by the movement of the saw in this diagonal line the wheel is caused to revolve, and consequently the point of bearing of the wheel against the saw is constantly changed to prevent the saw grooving the said wheel by a continued action at any one place. The wheel H may be slightly conical; but in all instances the surface of the wheel will be slightly concave, so that the diagonal line in which the saw travels may correspond to the surface of the wheel at the point of contact of the saw. In some instances the axis of this wheel will be a screw firmly inserted into the stock or guide-block, and I prefer to employ the screw 14, passing into a hole in the stock and having an oil-hole in it, as shown by dotted lines, so that the guide-wheel H is lubricated by oil from the oil-cup 5. In some instances the axis of the wheel H will be permanently connected to said wheel and turn within bearings in the stock A above and below the wheel, and to insure uniformity in the rotation of this guide-wheel H there may be a controlling device—such, for instance, as a pulley or gear-wheel acted upon by a screw-pinion—the motion of the parts being derived from a connection to the driving-wheel of the band-saw.

In Fig. 3 I have represented a modification in the construction of the guide-wheel. In this figure I have shown the said wheel as made in three sections 7 8 9 upon a tubular arbor 10, so that either section may revolve independently of the other, and these sections and the tubular arbor may be supported on a fixed screw or arbor 14, as represented in Fig. 2, or the arbor may be made with pivot-points, as represented in Fig. 3.

The advantage of this construction is that the sections may be turned to any desired position in relation to each other, and should one become grooved in its surface the pressure of the back of the saw will be taken upon one of the other sections that is not grooved, and thereby the saw will be held in its proper position.

In cases where the roller is above the side guides the pressure upon the teeth in sawing forces the saw back between the side guides, so that the set is taken out of the teeth and the teeth rendered blunt. It is therefore necessary to place the guide-wheel below the side guides and in such relation to the side guides that the plane in which the saw moves will intersect the axis of the roller near the middle of the roller; hence the pressure of the back of the saw will be greatest in the middle of the slightly-concave surface of the roller, and the saw will not slip laterally upon the roller.

It will be evident that when my guide is used below the table that supports the wood the entire guide will be inverted, so that the roller H in all cases is adjacent to the side guides, but between the same and the work.

I claim as my invention—

The combination, with the adjustable side guides, of the guide-wheel adjacent to the side guides and between the same and the work, such guide-wheel having a slightly-concave surface and placed so that the plane in which the saw moves intersects the axis of the wheel near the middle of the wheel, whereby the pressure of the back of the saw is greatest near the middle portion of the concave surface of the guide-wheel, substantially as specified.

Signed by me this 10th day of December, A. D. 1887.

REUBEN McCHESNEY.

Witnesses:
HAROLD SERRELL,
WILLIAM G. MOTT.